(12) United States Patent
Lee

(10) Patent No.: US 7,382,614 B2
(45) Date of Patent: Jun. 3, 2008

(54) POWER SUPPLY HAVING AN EXTENDABLE POWER INPUT PORT

(75) Inventor: Tzung-Han Lee, Hsin-Tien (TW)

(73) Assignee: Zippy Technology Corp., Hsin Tien, Taipei Hsien (TW)

( * ) Notice: Subject to any disclaimer, the term of this patent is extended or adjusted under 35 U.S.C. 154(b) by 773 days.

(21) Appl. No.: 10/853,164

(22) Filed: May 26, 2004

(65) Prior Publication Data

US 2005/0275991 A1 Dec. 15, 2005

(51) Int. Cl.
*H05K 7/20* (2006.01)

(52) U.S. Cl. .................. 361/695; 361/686; 361/687; 361/688; 361/690; 361/715; 361/728; 454/184

(58) Field of Classification Search .......... 361/679, 361/683, 686–689, 692–697, 728, 739, 736, 361/748, 752, 760; 439/530, 533, 535, 536, 439/540.1, 638, 650, 655; 29/861, 832; 363/144, 363/147; 307/150; 174/16.1, 17 R; 312/223.2; 454/184

See application file for complete search history.

(56) References Cited

U.S. PATENT DOCUMENTS

| | | | | |
|---|---|---|---|---|
| 5,855,064 A | * | 1/1999 | Chang | 29/861 |
| 6,246,580 B1 | * | 6/2001 | Weng | 361/695 |
| 6,304,443 B1 | * | 10/2001 | Chou | 361/695 |
| 6,967,837 B2 | * | 11/2005 | Shih | 361/687 |
| 7,187,544 B2 | * | 3/2007 | Tsai | 361/686 |

FOREIGN PATENT DOCUMENTS

| | | | |
|---|---|---|---|
| JP | 2002149294 A | * | 5/2002 |
| TW | 484721 | | 4/2002 |

\* cited by examiner

*Primary Examiner*—Michael Datskovskiy
(74) *Attorney, Agent, or Firm*—Muncy, Geissler, Olds & Lowe, PLLC

(57) ABSTRACT

A power supply having an extendable power input port connecting to a connection line to be installed on a side wall of a computer host. The side wall and the power supply form a heat dissipation passage therebetween to improve heated airflow in the computer host and increase heat dissipation effect without affecting electric plugging of the power supply.

10 Claims, 7 Drawing Sheets

POWER SUPPLY HAVING AN EXTENDABLE POWER INPUT PORT

BACKGROUND OF THE INVENTION

1. Field of the Invention

The present invention relates to power supply with an extendable power input port and particularly to a power supply with an altered design of the power input port to provide improved heat dissipation for computer host without affecting electric plugging of the power supply.

2. Brief Discussion of the Related Art

The conventional 1 U specification for computer host (hereinafter called host) has to house various type of data processing elements such as hard disk, interface cards and CPU in a small space, it becomes very crowd. As processing speed and performance constantly improve to meet the requirements of increasingly complex logic calculations and data processing, a great amount of heat is generated during operation. With limited interior space of 1 U and cost concern, it is not possible to add more air fans to improve air convection. How to improve heat dissipation efficiency with the existing air fans has become an issue all vendors try to address.

Refer to FIG. 1 for a R.O.C. Utility patent No. 484721 which provides an airflow channeling structure in a host coupling to a radiation fan assembly. One side wall of the host has an air outlet connecting to the airflow channeling structure to converge the airflow of the air fan assembly to rapidly disperse heat of the main heat source CPU. However due to every vendor has its own CPU specifications, and installation location of the CPU also is different. The airflow channeling structure has to be designed differently according to the different specifications. It is not economic effective.

To resolve this problem, one approach is to find out the common characteristics of all hosts. As the circuit board of most hosts has to be fixed on a selected location, the side wall of the computer where the circuit board is mounted has no additional space for heat dissipation. Only the location where the power supply is installed is changeable. Since the power supply and the air fan assembly are interposed by an interval which does not have any electronic element installed therein, by moving the power supply installation towards the air fan assembly, the power supply and the host side wall may form an additional interval to become a heat dissipation passage. However, such an arrangement creates a new problem. Because most power supply and the power input port are integrated. Moving the power supply rearwards will make plugging of electric power difficult. Moreover, the power supply generally is directly mounted on the side wall of the host. Relocating the power supply inside the host makes anchoring of the power supply a big problem to be overcome.

SUMMARY OF THE INVENTION

The primary object of the invention is to resolve the aforesaid disadvantages. The invention provides a novel design for power supply that has an extendable power input port connecting to a connection line to be installed on a host side wall so that the side wall and the power supply form a heat dissipation passage. Due to the extendable power input port is still located on the side wall, it does no affect electric plugging of the power supply. The additional heat dissipation passage can improve airflow of heated air in the host and enhance heat dissipation effect.

Another object of the invention is to provide an anchor section on the power supply to couple with an anchor rack for fastening to the host thereby to enable the power supply to be mounted steadily.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
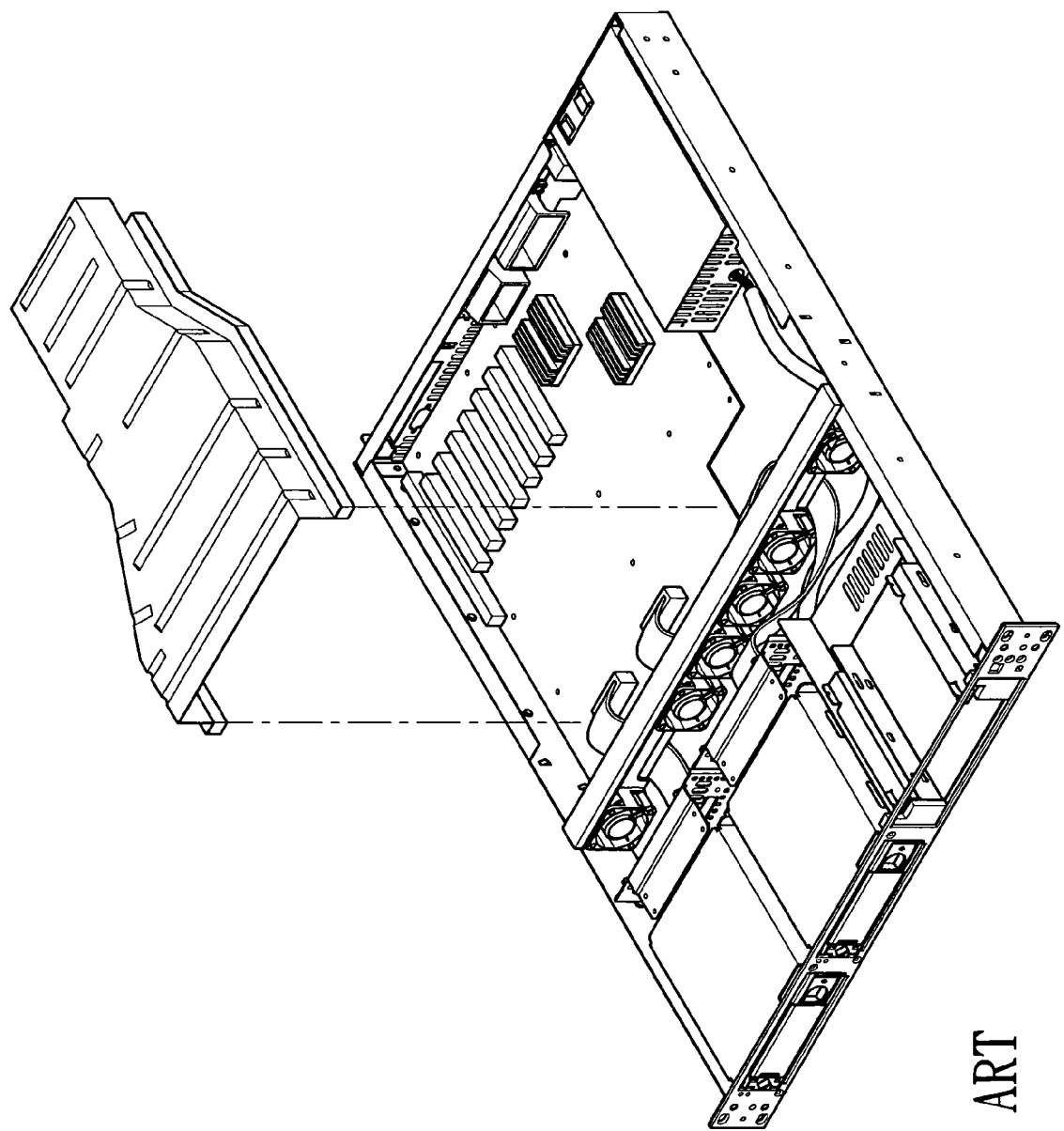
FIG. 1 is a schematic view of the structure disclosed in R.O.C. patent No. 484721.
Figure 2:
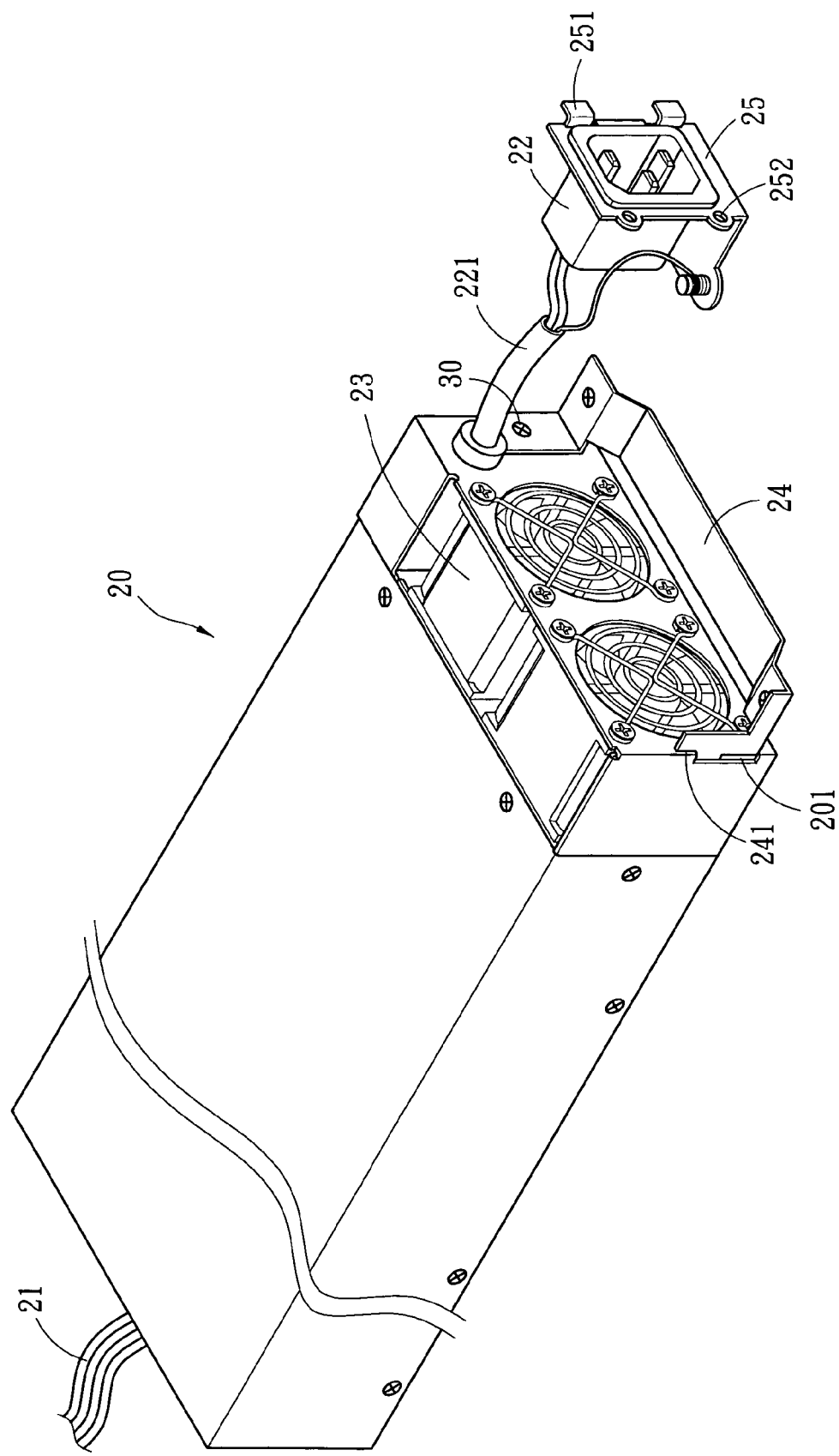
FIG. 2 is a perspective view of the present invention.
Figure 3:
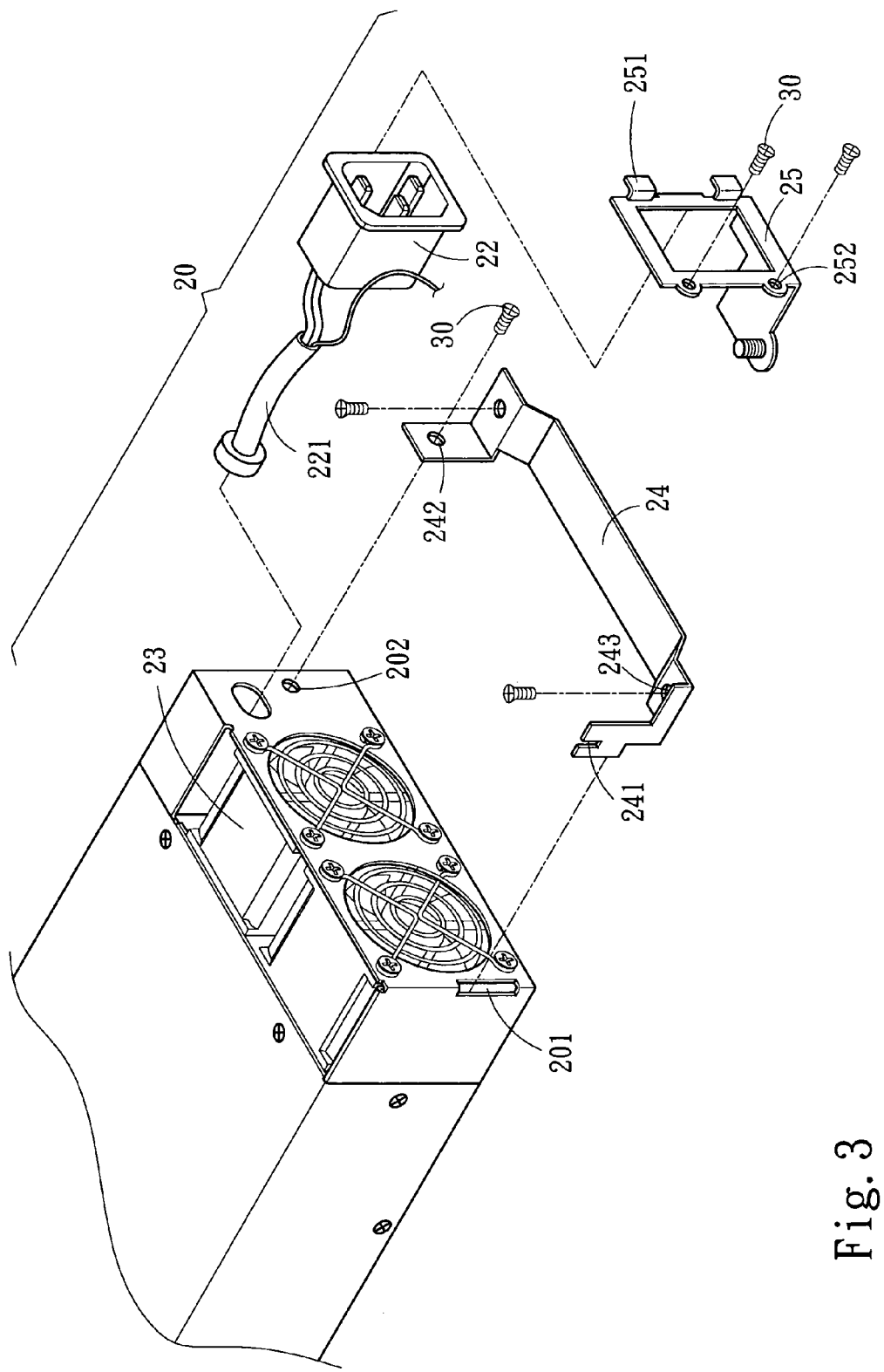
FIG. 3 is an exploded view of the present invention.

Please referring to FIGS. 2 through 5, the present invention provides a power supply 20 with an extendable power input port 22. The power supply 20 is located in the host 10. It has a power output port 21 and the extendable power input port 22 connecting through a connection line 221. The extendable power input port 22 is installed on a side wall 11 of the host 10. The power supply 20 and the side wall 11 form an interval which becomes a heat dissipation passage 16.

In this embodiment, the power supply 20 further has an anchor section to couple with an anchor rack 24 for installing on the host 10. The anchor section includes a latch slot 201 and a fastening hole 202. The anchor rack 24 has a hook 241 corresponding to the latch slot 201 and a first anchor hole 242 corresponding to the fastening hole 202 to receive a screw 30 for fastening to the power supply 20. The anchor rack 24 further has a second anchor hole 243 to receive another screw 30 for fastening to the host 10. The extendable power input port 22 also may be fastened to an anchor dock 25. The anchor dock 25 has an anchor lug 251 and a fastening section 252 to receive yet another screw 30 to fasten to the side wall 11 of the host 10.

Figure 4:
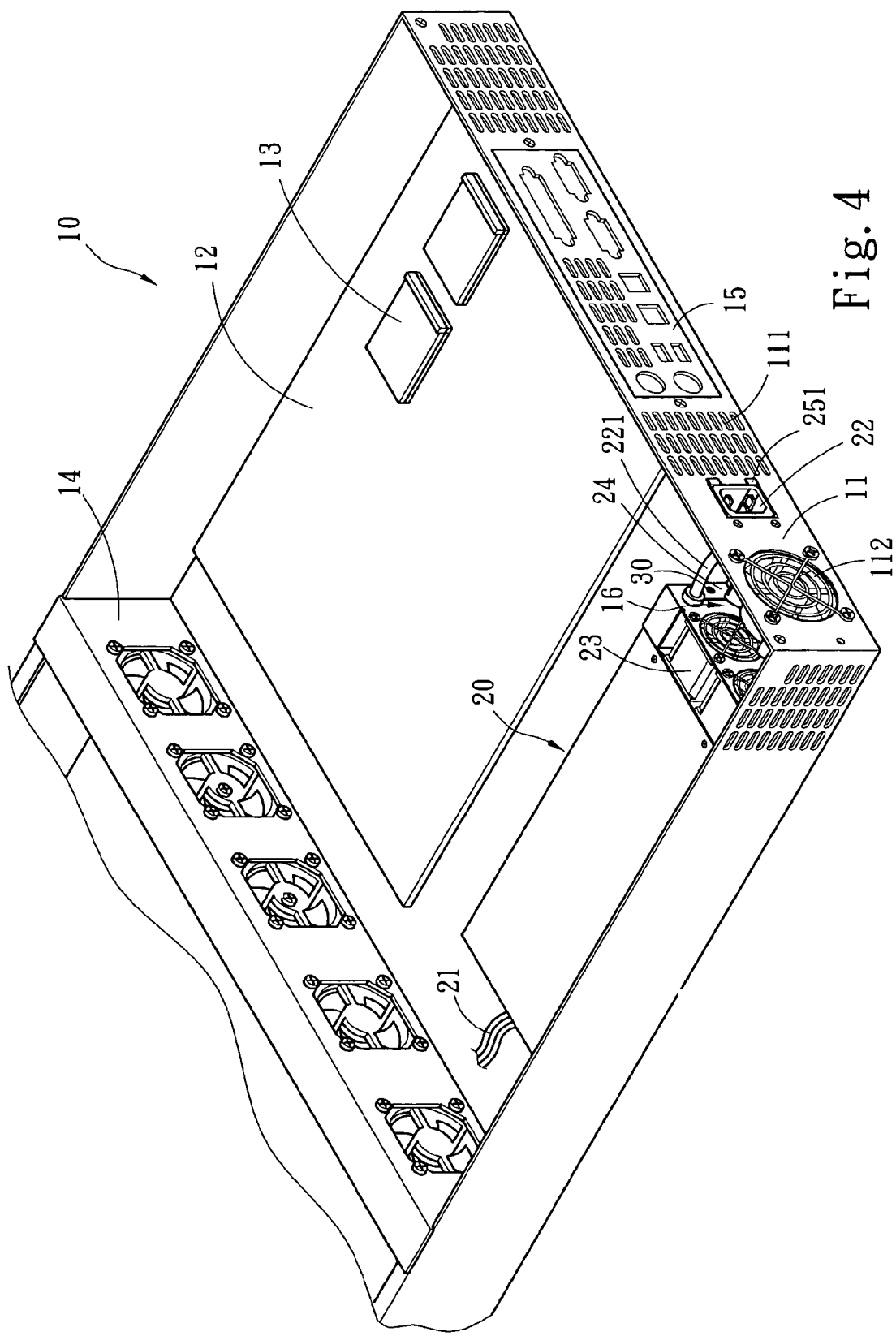
FIG. 4 is a perspective view of the invention mounted onto a host.
Figure 5:
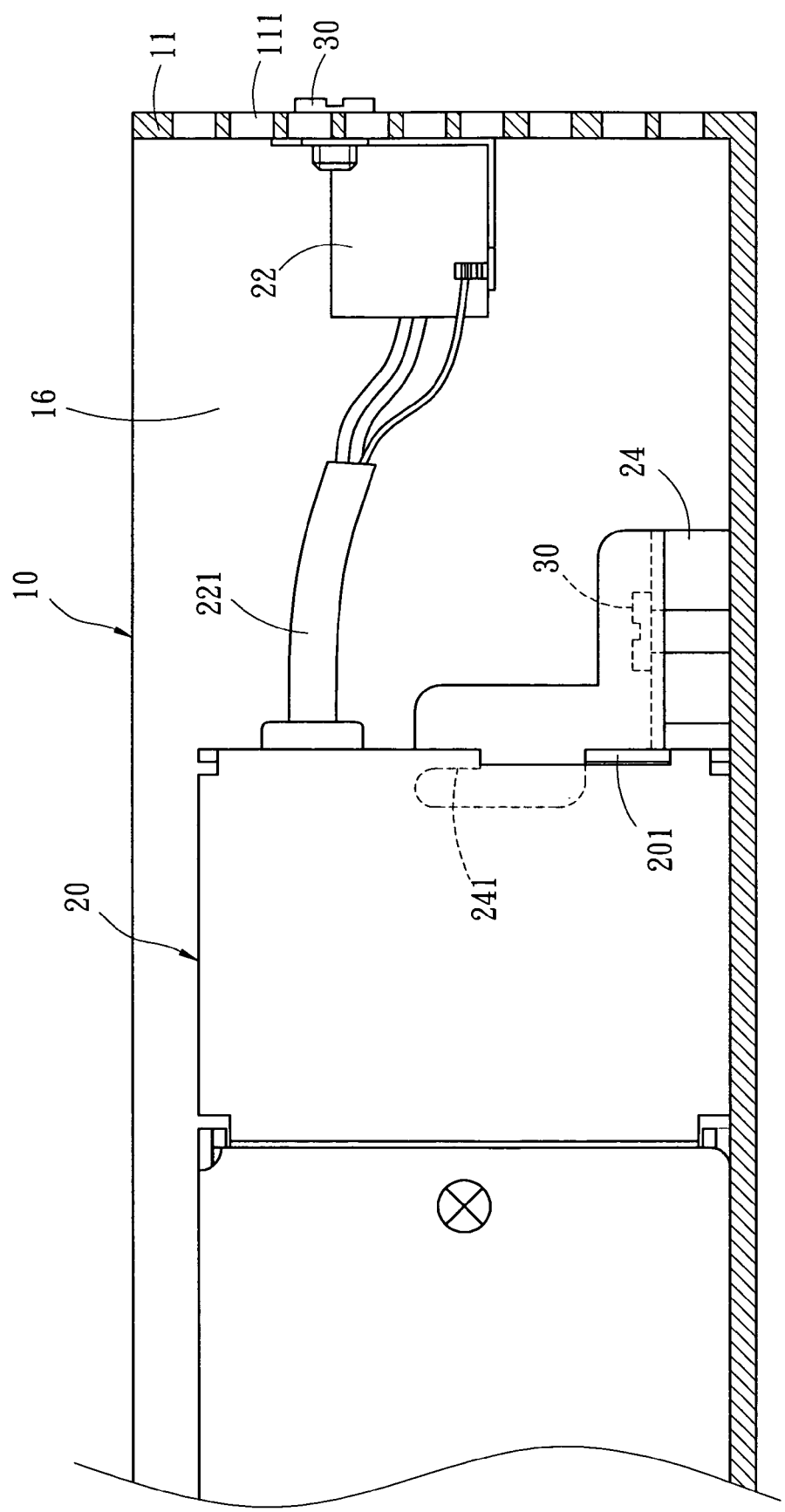
FIG. 5 is a sectional view of the invention mounted onto a host.

Referring to FIG. 4, the power supply 20 is installed inside the host 10. Since the power supply 20 and the host side wall 11 form the heat dissipation passage 16, it provides a heated air discharge channel for a CPU 13 or other electronic elements on the circuit board 12 for dispersing heat even if the side wall 11 where the circuit board 12 is mounted does not have space required to dispel the heated air due to occupation of a bus 15. Aside from the original air fan 23 of the power supply 20 that provides forced discharging airflow, an additional air fan 112 and radiation vent 111 may be mounted and formed on the side wall 11 corresponding to the heat dissipation passage 16 to enhance heat dissipation effect. In addition, as the extendable power input port 22 of the power supply 20 is mounted on the side wall 11 through the connection line 221, plugging of electricity for the power supply 20 that is installed inside is not affected.

Figure 6:
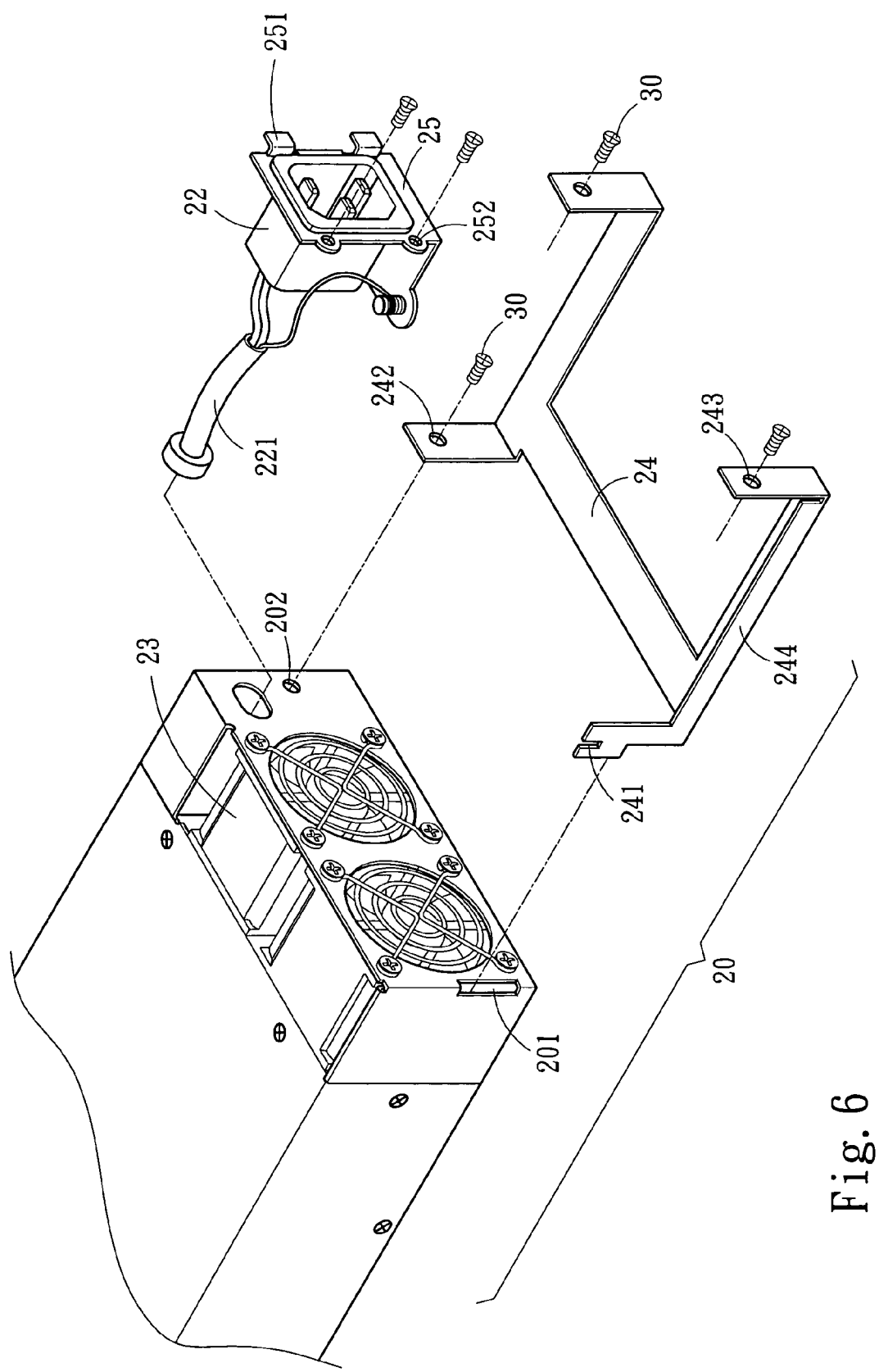
FIG. 6 is an exploded view of another embodiment of the invention.
Figure 7:
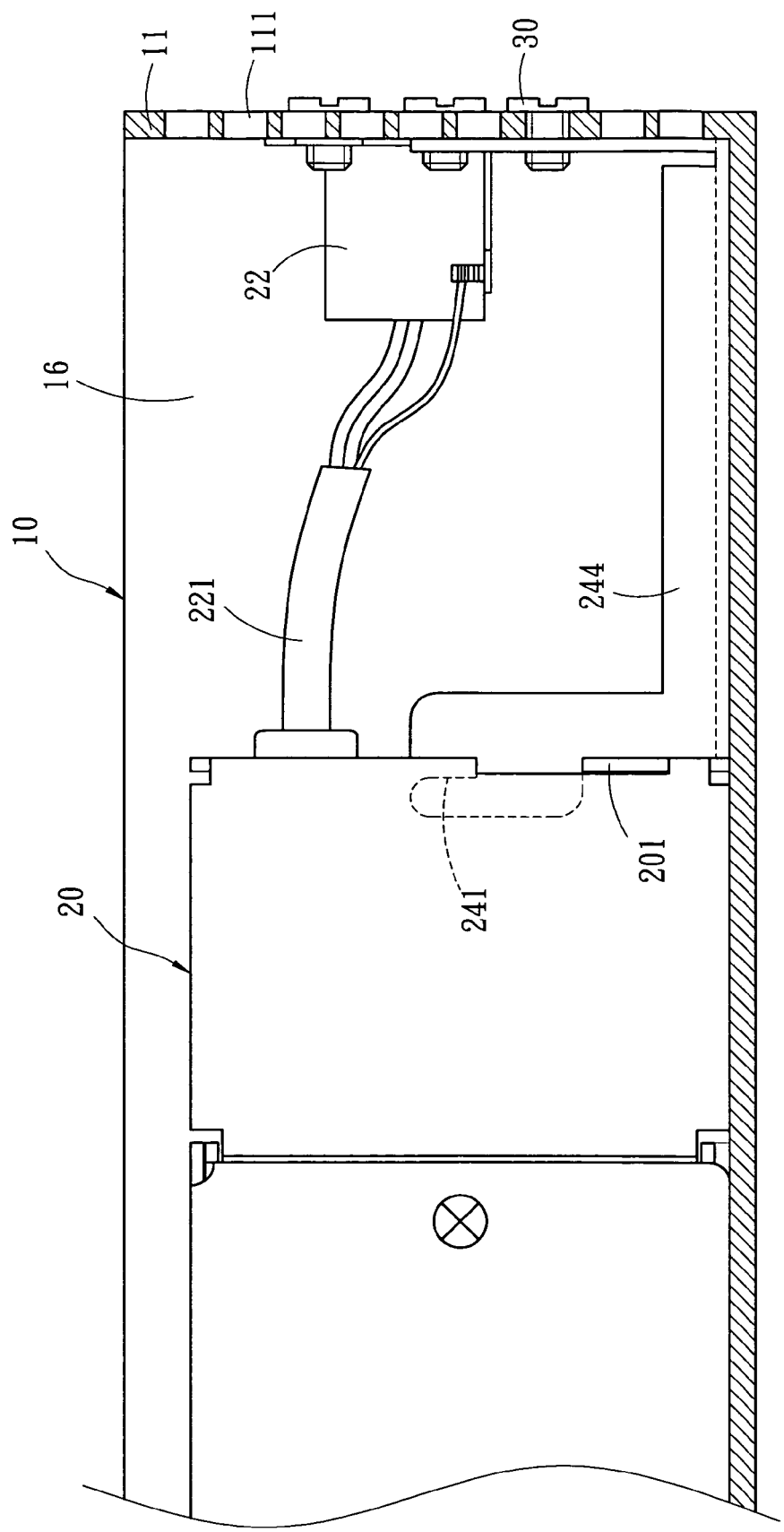
FIG. 7 is a sectional view of another embodiment of the invention.

Refer to FIGS. 6 and 7 for another embodiment of the invention. It differs from the previous embodiment in that the power supply 20 is coupled with a different type of anchor rack 24. In this embodiment, the anchor section has a latch slot 201 and a fastening hole 202. The anchor rack 24 has a hook 241 corresponding to the latch slot 201 and a first anchor hole 242 corresponding to the fastening hole 202 to receive a screw 30 to fasten to the power supply 20. The anchor rack 24 further has an anchor arm 244 extended towards the side wall 11. The anchor arm 244 has a second anchor hole 243 to receive another screw 30 to fasten to the side wall 11 of the host 10. The function and heat dissipation effect are same as those previously discussed. Details are omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply having an extendable power input port installed in a computer host comprising a power output port and an extendable power connecting through a connection line, the extendable power input port being installed on a side wall of the computer host such that the power supply and the side wall form an interval to become a heat dissipation passage, wherein the power supply further has an anchor section to couple with an anchor rack for fastening to the computer host.

2. The power supply having an extendable power input port of claim 1, wherein the anchor section includes a latch slot and a fastening hole, the anchor rack having a hook corresponding to the latch slot and a first anchor hole corresponding to the fastening hole to receive a screw for fastening to the power supply, and a second anchor hole to receive another screw for fastening to the computer host.

3. The power supply having an extendable power input port of claim 1, wherein the anchor section includes a latch slot and a fastening hole, the anchor rack having a hook corresponding to the latch slot and a first anchor hole corresponding to the fastening hole to receive a screw for fastening to the power supply, and an anchor arm extended towards the side wall having a second anchor hole to receive another screw for fastening to the side wall of the computer host.

4. The power supply having an extendable power input port of claim 1, wherein the extendable power input port is mounted onto an anchor dock which has an anchor lug and a fastening section which receives a screw to fasten to the side wall of the computer host.

5. The power supply having an extendable power input port of claim 1, further having an air fan installed on the side wall of the computer host.

6. A power supply having an extendable power input port installed in a computer host comprising a power output port and an extendable power connecting through a connection line, the extendable power input port being installed on a side wall of the computer host such that the power supply and the side wall form an interval to become a heat dissipation passage, wherein the extendable power input port is mounted onto an anchor dock which has an anchor lug and a fastening section which receives a screw to fasten to the side wall of the computer host.

7. The power supply having an extendable power input port of claim 6, wherein the power supply further has an anchor section to couple with an anchor rack for fastening to the computer host.

8. The power supply having an extendable power input port of claim 7, wherein the anchor section includes a latch slot and a fastening hole, the anchor rack having a hook corresponding to the latch slot and a first anchor hole corresponding to the fastening hole to receive a screw for fastening to the power supply, and a second anchor hole to receive another screw for fastening to the computer host.

9. The power supply having, an extendable power input port of claim 7, wherein the anchor section includes a latch slot and a fastening hole, the anchor rack having a hook corresponding to the latch slot and a first anchor hole corresponding to the fastening hole to receive a screw for fastening to the power supply, and arm anchor arm extended towards the side wall having a second anchor hole to receive another screw for fastening to the side wall of the computer host.

10. The power supply having an extendable power input port of claim 6, further having an air fan installed on the side wall of the computer host.

* * * * *